United States Patent [19]
Baymak et al.

[11] Patent Number: 4,799,632
[45] Date of Patent: Jan. 24, 1989

[54] SEAT FOR A VEHICLE, ESPECIALLY AN AIRCRAFT SEAT

[75] Inventors: Faruk Baymak, Hamburg; Helmut Stueben, Gruenendeich, both of Fed. Rep. of Germany

[73] Assignee: Messerschmitt-Boelkow-Blohm GmbH, Munich, Fed. Rep. of Germany

[21] Appl. No.: 105,392

[22] Filed: Oct. 5, 1987

[30] Foreign Application Priority Data

Oct. 13, 1986 [DE] Fed. Rep. of Germany ....... 3634839

[51] Int. Cl.4 .............................................. B64D 11/06
[52] U.S. Cl. .................................. 244/122 R; 297/244; 297/192; 297/341
[58] Field of Search .................... 244/122 R; 297/244, 297/192, 484, 320, 321, 324, 341, 342, 343

[56] References Cited
U.S. PATENT DOCUMENTS

| 837,050 | 11/1906 | Garnett | 297/343 |
| 1,167,831 | 1/1916 | Kilburn | 297/244 |
| 3,379,471 | 4/1968 | Dalziel | 297/244 |

FOREIGN PATENT DOCUMENTS

| 2056726 | 5/1972 | Fed. Rep. of Germany | 297/191 |
| 201 | 1/1902 | United Kingdom | 297/244 |

Primary Examiner—Galen Barefoot
Assistant Examiner—Rodney Corl
Attorney, Agent, or Firm—W. G. Fasse; D. H. Kane, Jr.

[57] ABSTRACT

A vehicle seat, especially for attendants in an aircraft is constructed as a double seat. The seat is equipped with seat cushions on opposite sides of a frame made of two posts interconnected by a cross-member. The seats are preferably hinged to opposite frame sides so that one or the other or both seats can be used.

10 Claims, 5 Drawing Sheets

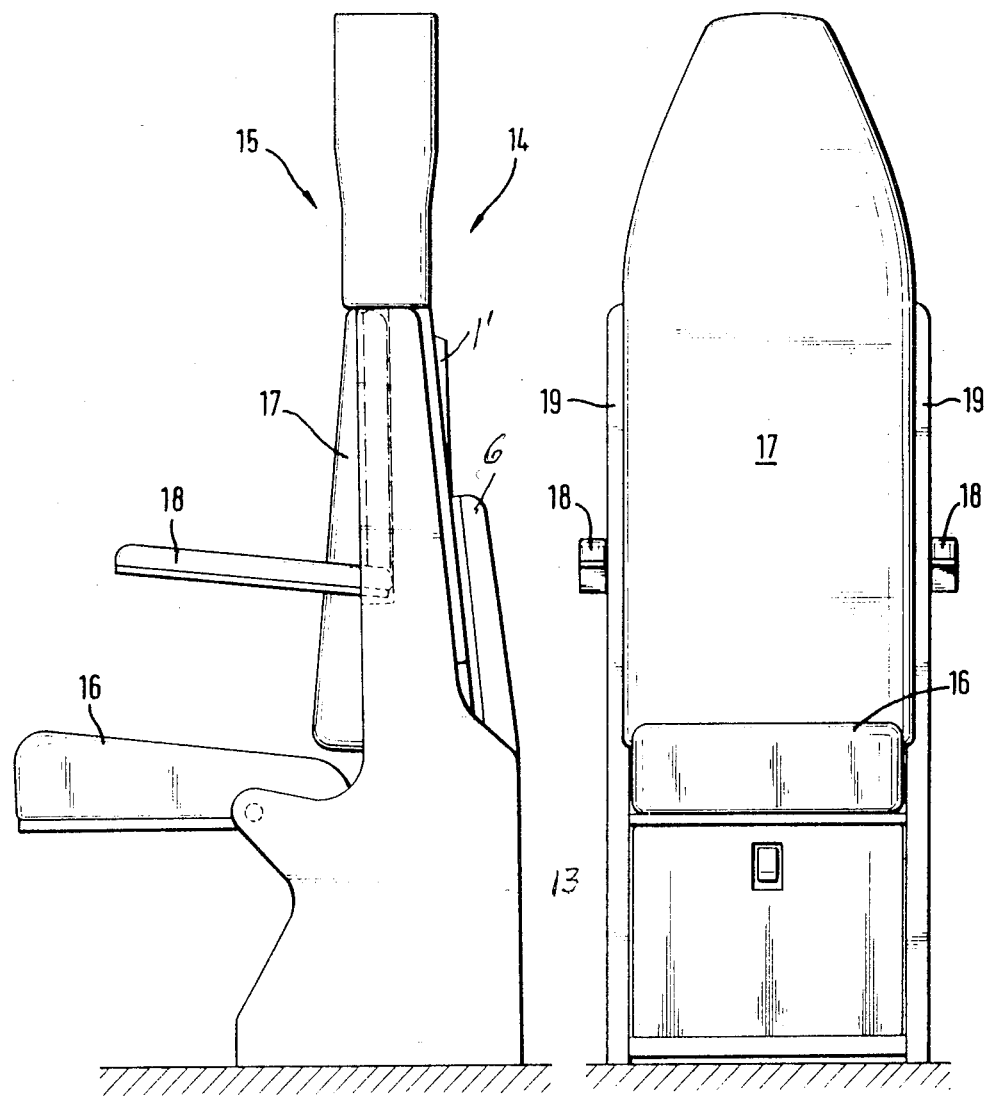

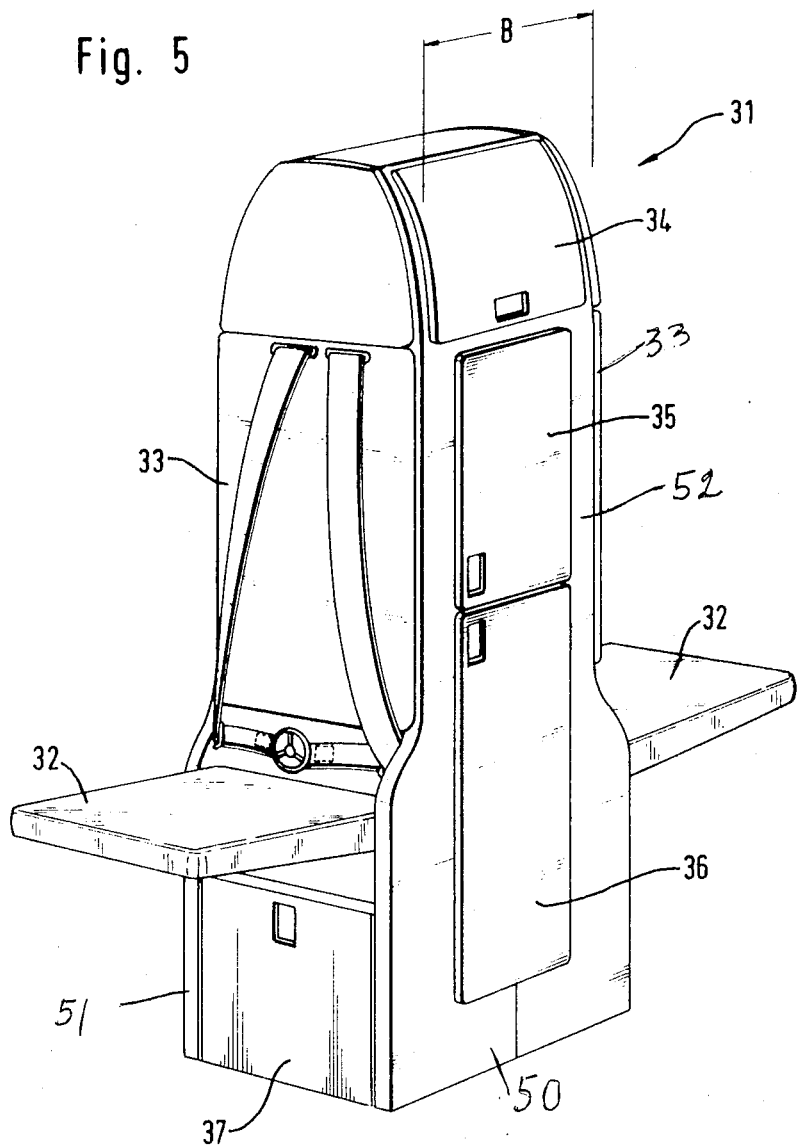

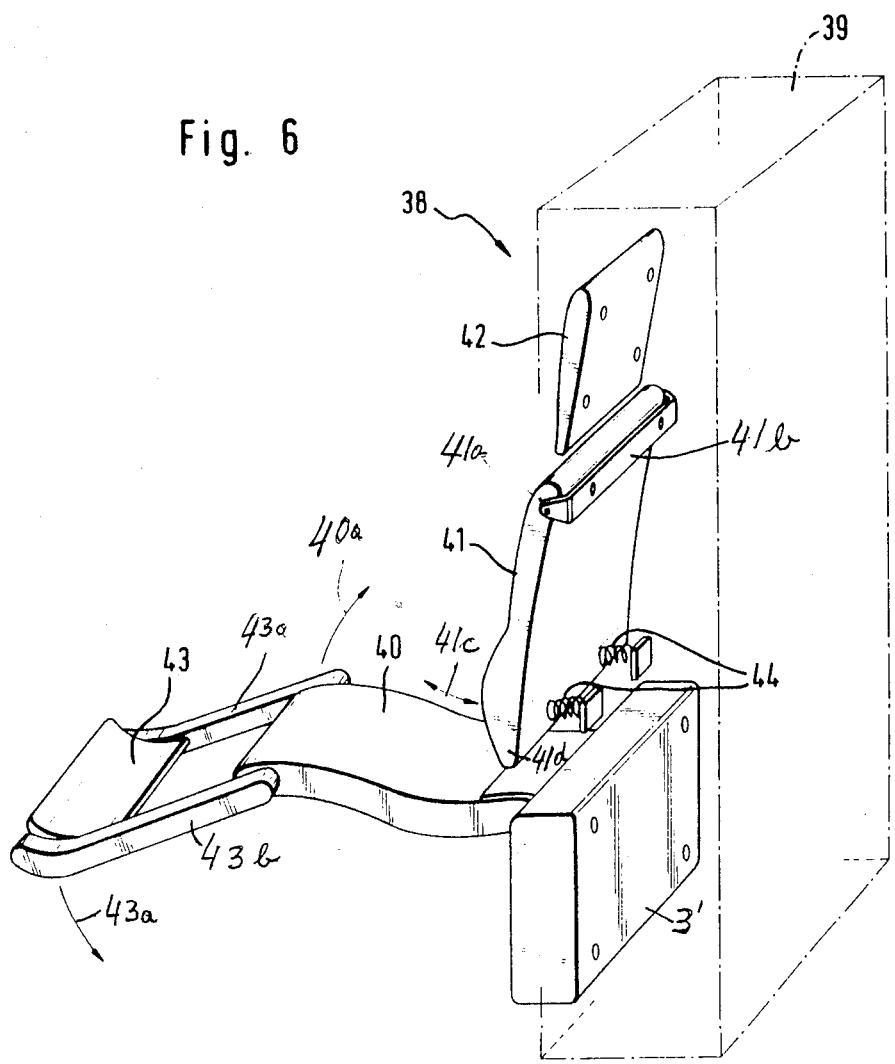

SEAT FOR A VEHICLE, ESPECIALLY AN AIRCRAFT SEAT

FIELD OF THE INVENTION

The invention relates to a vehicle seat, especially for an aircraft. The seat is equipped with a backrest and with a foldable seat for an attendant in an aircraft.

DESCRIPTION OF THE PRIOR ART

In accordance with regulations it is necessary that flight attendants sit down in an aircraft on so-called attendant seats during take-off and landing. Such attendant seats are also equipped with safety belts and are conventionally attached to walls, particularly in recesses of passenger aircraft. During cruise flight these seats are folded out of the way. In connection with large capacity aircraft it is necessary to increase the number of flight attendants to take care of the large number of passengers. Accordingly, it is also necessary to provide a respective number of flight attendant seats. However, the space required for these flight attendant seats is not always available in recesses and the like. Similarly, walls in the aircraft next to passageways cannot be used for placing these seats for safety reasons. Thus, the flight attendant seats must be located in the space allocated for passenger seats. However, such arrangement is undesirable because it reduces the number of passenger seats and thus the economy of operating the aircraft.

It is further required that extra space is available next to the seats of flight attendants for storing supplies and emergency equipment.

OBJECTS OF THE INVENTION

In view of the foregoing it is the aim of the invention to achieve the following objects singly or in combination:

to construct a flight attendant seat of the above type in such a way that the available space is efficiently used without an excessive effort and expense to thereby simultaneously provide additional storage space for the above mentioned purposes;

to construct a flight attendant seat so that it can be located in a free standing manner in any available space; and to construct the seat in such a way that it is sufficiently comfortable to be used for longer periods of time and possibly also for a passenger if necessary.

SUMMARY OF THE INVENTION

According to the invention the vehicle seat is characterized in that the backrest is constructed of two upright posts interconnected by at least one cross-beam to form a frame which is equipped with two backrest cushions facing in opposite directions and foldable seats are hinged to the frame structure also on both sides, whereby the persons seated on such a double seat face in opposite directions.

A seat constructed as taught herein has the advantage that the frame structure with its upright posts and crossbar are utilized for two seats with their respective backrests, headrests, and so forth. Thus, the space requirement is substantially reduced and the available space is hence used more efficiently. Additionally, it becomes possible to use any mounting components, guide components, and spring or tensioning elements in a double fashion, thereby reducing the number of components required for two seats.

These features of the invention in combination with fewer required parts result in a weight reduction and hence in an improved economy of operating the aircraft. By constructing these seats as double seats it becomes possible to employ additional flight attendants. Another advantage is seen in that by locating these seats in a central position one flight attendant can monitor the cabin portion in a backward direction while the other flight attendant can monitor the cabin in a forward direction. Additionally, the arrangement provides storage space for emergency supplies, etc.

BRIEF DESCRIPTION OF THE DRAWINGS

In order that the invention may be clearly understood, it will now be described, by way of example, with reference to the accompanying drawings, wherein:

FIG. 2 shows a side view of a more comfortable double seat according to the invention, whereby the left-hand side is shown in an unfolded condition while the right-hand side is shown in a folded condition;

FIG. 3 is a front view of the seat according to FIG. 2;

FIG. 5 is a perspective view of a further embodiment of a seat according to the invention providing storage space below the seat proper and between the backrest cushions as well as between the headrest cushion; and FIG. 6 shows a perspective view of one half of a double seat according to the invention with a footrest.

DETAILED DESCRIPTION OF PREFERRED EXAMPLE EMBODIMENTS AND OF THE BEST MODE OF THE INVENTION

Figure 1:
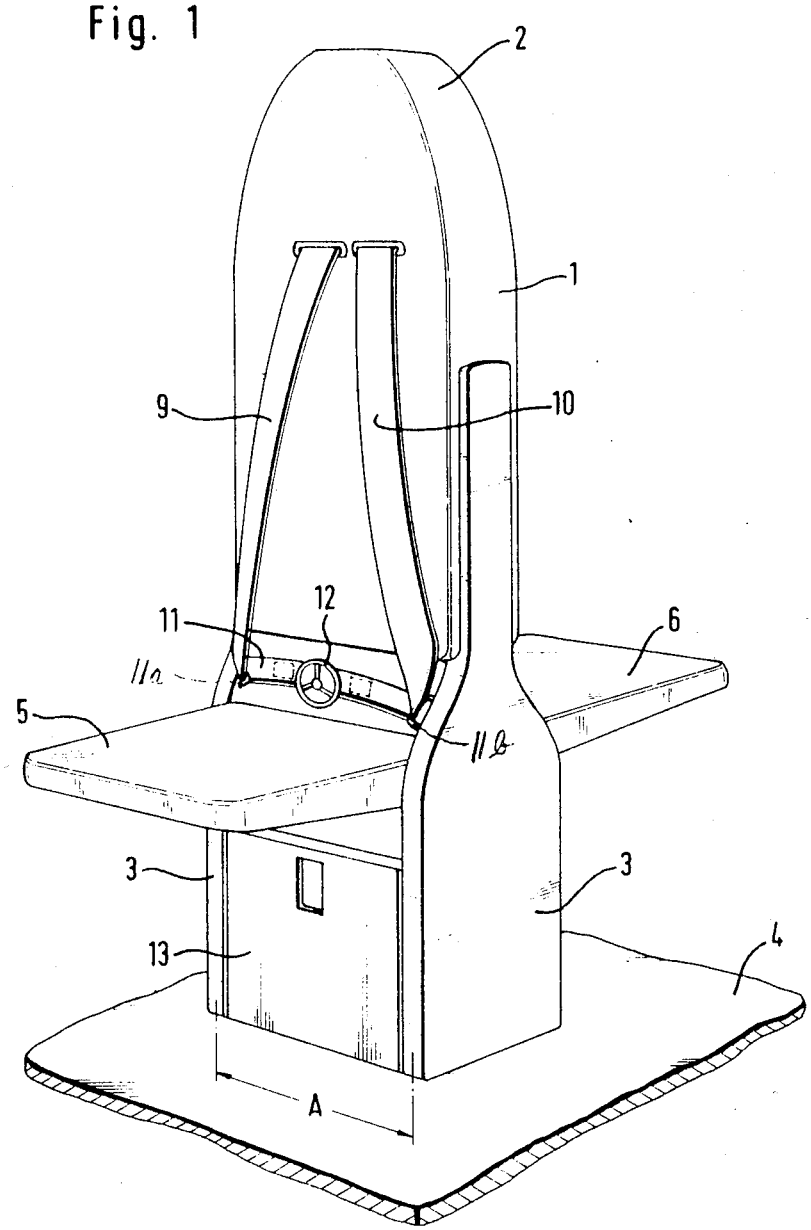
FIG. 1 illustrates a perspective view of a flight attendant seat according to the invention with storage space below the seat.

FIG. 1 shows a flight attendant double seat with a double backrest 1, the upper end of which is formed as a double headrest 2. A frame structure is formed by two upright posts 3 conventionally mounted to the floor 4 and interconnected by at least one crossmember 3' shown in FIG. 6. The cross-member has a standardized length so that the spacing A between the upright posts 3 is assured for mounting the posts, for example, on rails provided for this purpose in the floor 4. The rails are not shown since they are conventional. Two foldable seats 5 and 6 are hinged to the uprights at a suitable height. These seats are spring biassed so that they will fold automatically into an upward position when the seats 5, 6 are unoccupied. The backrest is further equipped on each side with two shoulder straps 9 and 10 integrated with a pelvis restraining belt 11, the ends of which are interconnectable by a belt lock 12. The loop connecting the straps 9 and 10 to the belt 11 pass through restraining anchor rings 11a and 11b. The space between the two upright posts 3 below the seats 5, 6 is accessible from both sides as a storage cabinet which is closeable by doors 13.

FIGS. 2 and 3 show a flight attendant seat constructed substantially as described above. However, the construction is such that the right-hand side 14 of the seat has the features of the seat described above with reference to FIG. 1, while the left-hand portion 15 has more comfortable features. Thus, the seat portion 15 has a thicker seat cushion 16, a thicker backrest cushion 17, and two armrests 18. Accordingly, the two upright posts 19 are non-symmetrical to accommodate the different types of cushions. The two uprights 19 are again interconnected by at least one crossbar not shown. The seat 15 is intended as a resting seat on long duration flights. Further, such seats could even be used individually for passengers, whereby the portion 14 might remain unused, for example when it faces a cabin wall. Even in this type of use the double arrangement provides a substantial space saving because the rear portion, so to speak, with its folding seat 6 and its backrest 1' hardly requires more space than a conventional seat so that, for example, upon removal of a cabin dividing wall immediately extra seating is available.

Figure 4:
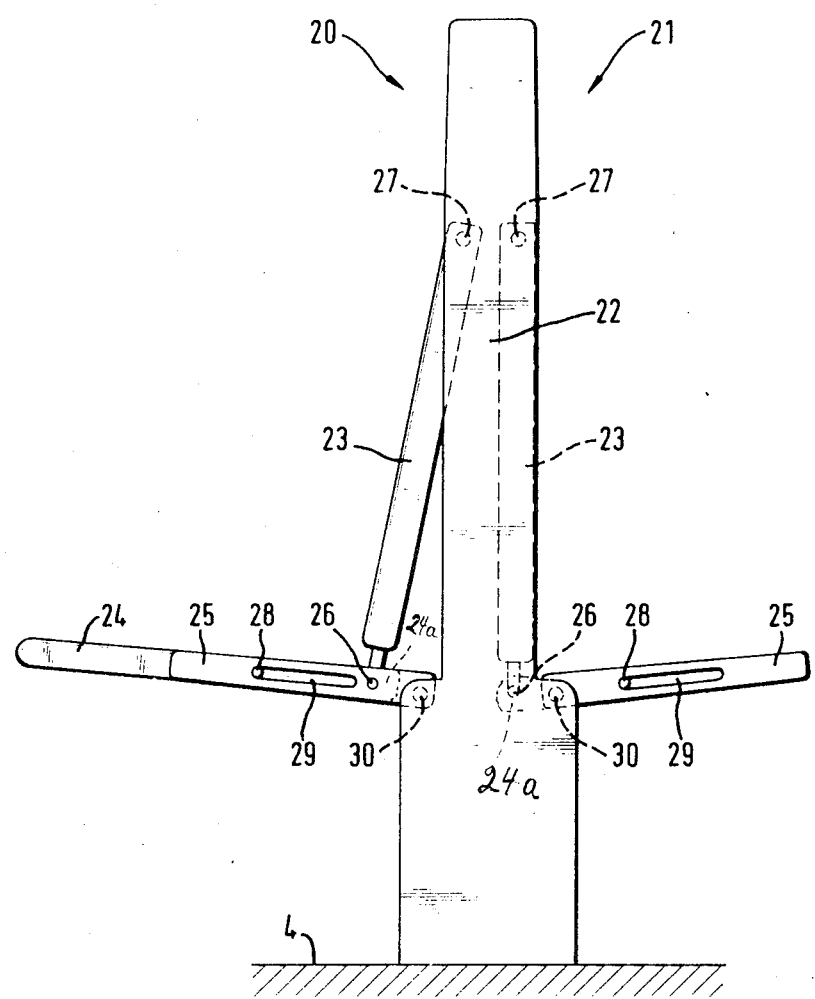
FIG. 4 is a side view of a double seat according to the invention with position adjustable seat members and backrest cushions, whereby the left-hand side is shown in an unfolded condition while the righthand side shows the backrest in a recess position while the seat is still unfolded, but recessed in its support bracket.

FIG. 4 illustrates a side view of two seats 20 and 21 between upright posts 22 as described. Each seat comprises its own backrest cushion 23 hinged at 27 to the frame structure formed by the uprights 22. Each seat 24 is slidably mounted in two mounting brackets 25, one of which is provided on the left side and the other on the right side of each seat. The mounting brackets 25 are hinged at their rear ends by hinges 30 to the uprights. The lower ends of the backrest cushions 23 are hinged to the rear edges 24a of the seat cushions 24 which in turn are slidably held in the brackets 25 as mentioned above. For this purpose the brackets have longitudinal slots 29 in which guide studs 28 secured to the sides of the seat cushions 24, can slide back and forth. The hinges 26 which pivot the lower end of the backrest cushions 23 to the respective rear edge 24a of the seats 24 are permitted to move sufficiently back and forth substantially in a horizontal direction because the hinges 27 are guided in the uprights 22 for a sufficient up and down movement in guide grooves not shown. If desired, each seat 24 may be arrested in several intermediate positions between the ends of the slots 29. The means for such arresting are conventional and hence not shown. The backrest 23 of the seat 21 is shown in its folded-in condition inside the frame structure formed by the uprights 22. The right-hand seat 24 is also in its rearward most position within the two brackets 25. However, the right-hand seat is still in its substantially horizontal position. Springs may be provided for automatically folding the seat upwardly when the backrest is in the dashed line position shown in FIG. 4. The folding of the seat 24 into an upright position can be accomplished regardless of the seat position relative to the respective mounting brackets 25.

FIG. 5 shows an embodiment in which the uprights 50 have, in the area between the backrests 33, a width B sufficient to form storage space, not only below the seats 32, but also between the backrests 33, whereby the uprights simultaneously form cabinet enclosing walls 52 provided with openings closeable by doors 34, 35, and 37.

FIG. 6 shows a seat mounted in a frame structure 39 only shown in dash-dotted lines, but also comprising its two uprights interconnected by a cross-member 3'. The seat 38 shows only one half of a double seat. The other half is constructed in the same way and also supported in the frame structure 39. The seat 38 has a foldable seat member 40, a backrest cushion 41 and a headrest 42. The forward edge of the seat member 40 carries a footrest 43 which is journalled to the forward edges of the seat with the aid of two connecting rods 43a and 43b. The footrest 43 itself is pivoted to the lower ends of the rods 43a and 43b. Thus, a flight attendant may have a more restful opportunity to sit on long duration flights. The upper edge 41a of the backrest 41, is hinged to the frame structure with the aid of a bracket 41b so that the backrest may be adjusted as shown by the arrow 41c, whereby the lower edge 41d of the backrest is preferably supported by springs 44 which are so arranged that they hold the lower end of the backrest 41 in a forwardly extended position. This also increases the comfort provided by the chair. The seat 40 can be folded upwardly as indicated by the arrow 40a when the seat is not in use. The footrest can be folded downwardly as indicated by the arrow 43a when the seat is not in use. Additionally, the rods 43a, 43b can be arrested in any desired position by conventional means. Further, the lower ends of the rods 43a, 43b may rest on the floor so that the footrest 43 may provide a foot stool when the seat is in use.

Although the invention has been described with reference to specific example embodiments, it will be appreciated, that it is intended to cover all modifications and equivalents within the scope of the appended claims.

What we claim is:

1. A vehicle seat, especially for an aircraft, comprising two uprights and rigid crossbar means interconnecting said two uprights to form a frame structure, double backrest means connected to said frame structure, first backrest cushion means on one side of said double backrest means, second backrest cushion means on the other side of said double backrest means, first seat means and first hinge means securing said first seat means to said vehicle seat for cooperation with said first backrest cushion means, second seat means and second hinge means securing said second seat means to said vehicle seat for cooperation with said second backrest cushion means, safety belt means secured to both sides of said vehicle seat to permit the use of the seat by two persons simultaneously facing in opposite directions, said vehicle seat further comprising first and second bracket means for mounting each of said first and second seat means to said frame structure, slide means slidably mounting said first and second seat means to said bracket means, said first and second hinge means connecting said first and second bracket means to a respective point of said frame structure, and further hinge means connecting said backrest means to said seat means and to said frame structure.

2. The vehicle seat of claim 1, wherein said two uprights include wall means for enclosing a space between said two uprights to form at least one storage cabinet, an opening in said wall means for providing access into said storage cabinet, and door means connected to said wall means for closing said opening.

3. The vehicle seat of claim 2, wherein said storage cabinet has two sections, a first cabinet section being located between said two uprights and a second cabinet section being located below said seat means.

4. The vehicle seat of claim 2, wherein said first cabinet section located between said two uprights, is positioned between said first and second backrest cushion means and between said first and second seat means.

5. The vehicle seat of claim 4, wherein said door means are located in said wall means laterally between said first and second backrest cushion means and laterally between said first and second seat means.

6. A vehicle seat, especially for an aircraft, comprising two uprights and rigid crossbar means interconnecting said two uprights to form a frame structure, double backrest means connected to said frame structure, first backrest cushion means on one side of said double backrest means, second backrest cushion means on the other side of said double backrest means, first seat means and first hinge means securing said first seat means to said vehicle seat for cooperation with said first backrest cushion means, second seat means and second hinge means securing said second seat means to said vehicle seat for cooperation with said second backrest cushion means, safety belt means secured to both sides of said vehicle seat to permit the use of the seat by two persons simultaneously facing in opposite directions, said vehicle seat further comprising means for tiltably securing an upper edge of said backrest cushion means to said frame structure, and spring means for mounting a lower edge of said backrest cushion means to said frame structure, whereby said backrest cushion means is positionable into different angular positions.

7. The vehicle seat of claim 6, wherein said two uprights include wall means for enclosing a space between said two uprights to form at least one storage cabinet, an opening in said wall means for providing access into said storage cabinet, and door means connected to said wall means for closing said opening.

8. The vehicle seat of claim 7, wherein said storage cabinet has two sections, a first cabinet section being located between said two uprights and a second cabinet section being located below said seat means.

9. The vehicle seat of claim 8, wherein said first cabinet section located between said two uprights is positioned between said first and second backrest cushion means and between said first and second seat means.

10. The vehicle seat of claim 7, wherein said door means are located in said wall means laterally between said first and second backrest cushion means and laterally between said first and second seat means.

* * * * *